United States Patent [19]
Bissett et al.

[11] Patent Number: 5,896,523
[45] Date of Patent: Apr. 20, 1999

[54] LOOSELY-COUPLED, SYNCHRONIZED EXECUTION

[75] Inventors: Thomas D. Bissett, Northborough; Paul A. Leveille, Grafton; Erik Muench, Groveland; Glenn A. Tremblay, Upton, all of Mass.

[73] Assignee: Marathon Technologies Corporation, Boxboro, Mass.

[21] Appl. No.: 08/868,670

[22] Filed: Jun. 4, 1997

[51] Int. Cl.[6] .................................................. G06F 11/00
[52] U.S. Cl. ...................... 395/551; 395/553; 395/182.1
[58] Field of Search .................................. 395/388, 390, 395/551, 552, 553, 557, 559, 182.1

[56] References Cited

U.S. PATENT DOCUMENTS

| | | | |
|---|---|---|---|
| 4,270,168 | 5/1981 | Murphy et al. | 364/200 |
| 4,356,546 | 10/1982 | Whiteside et al. | 364/200 |
| 4,358,823 | 11/1982 | McDonald et al. | 364/200 |
| 4,449,182 | 5/1984 | Rubinson et al. | 364/200 |
| 4,531,185 | 7/1985 | Halpern et al. | 364/200 |
| 4,634,110 | 1/1987 | Julich et al. | 371/11 |
| 4,812,968 | 3/1989 | Poole | 364/200 |
| 4,823,256 | 4/1989 | Bishop et al. | 364/200 |
| 4,907,228 | 3/1990 | Bruckert et al. | 371/68.3 |
| 4,920,481 | 4/1990 | Binkley et al. | 364/200 |

(List continued on next page.)

FOREIGN PATENT DOCUMENTS

| | | |
|---|---|---|
| 0286 856 | 10/1988 | European Pat. Off. . |
| WO-93-09494 | 5/1993 | WIPO . |
| WO-95-15529 | 6/1995 | WIPO . |

OTHER PUBLICATIONS international Search Report dated Sep. 9, 1998.
Integrated Micro Products, "XM–RISC Fault Tolerant Computer System," sales brochure (1992).
Marathon Technologies Corporation, "Fault Tolerant Server I/O Kit," sales brochure.
Marathon Technologies Corporation, "Mial Server Kits," sales brochure.
Marathon Technologies Corporation, Press Release dated Apr. 7, 1997, "Marathon Technologies Now Shipping Industry First Fault Tolerant Windows NT Server Solution," Boxborough, MA.
Marathon Technologies Corporation, "Endurance™: A New Paradigm for the Lowest Cost Fault Tolerant and Site Disaster Tolerant Solutions for PC Server and Cluster Systems," Fault Tolerant Systems—White Paper (Apr. 3, 1997).
Siewiorek et al., *Reliable Computer Systems—Design and Evaluation*, Second Edition, Digital Equipment Corporation, Digital Press, pp. 618–622 (1992).
Williams, "New Approach Allows Painless Move to Fault Tolerance," Computer Design, May 1992, PennWell Publishing Company.

*Primary Examiner*—Dennis M. Butler
*Attorney, Agent, or Firm*—Fish & Richardson PC

[57] ABSTRACT

Synchronized execution is maintained by compute elements processing instruction streams in a computer system including the compute elements and a controller. Each compute element includes a clock that operates asynchronously with respect to clocks of the other compute elements. Each compute element processes instructions from an instruction stream and counts the instructions processed. Upon processing a quantum of instructions from the instruction stream, the compute element initiates a synchronization procedure and continues to process instructions from the instruction stream and to count instructions processed from the instruction stream. The compute element halts processing of instructions from the instruction stream after processing an unspecified number of instructions from the instruction stream in addition to the quantum of instructions. Upon halting processing, the compute element sends a synchronization request to the controller and waits for a synchronization reply.

47 Claims, 10 Drawing Sheets

U.S. PATENT DOCUMENTS

| | | | |
|---|---|---|---|
| 4,937,741 | 6/1990 | Harper et al. | 364/200 |
| 4,965,717 | 10/1990 | Cutts, Jr. et al. | 364/200 |
| 5,048,022 | 9/1991 | Bissett et al. | 371/40.1 |
| 5,095,423 | 3/1992 | Gramlich et al. | 395/600 |
| 5,193,175 | 3/1993 | Cutts, Jr. et al. | 395/575 |
| 5,226,152 | 7/1993 | Klug et al. | 395/575 |
| 5,239,641 | 8/1993 | Horst | 395/550 |
| 5,249,187 | 9/1993 | Bruckert et al. | 371/68.1 |
| 5,251,312 | 10/1993 | Sodos | 395/425 |
| 5,255,367 | 10/1993 | Bruckert et al. | 395/200 |
| 5,261,092 | 11/1993 | McLaughlin et al. | 395/600 |
| 5,276,823 | 1/1994 | Cutts, Jr. et al. | 395/575 |
| 5,295,258 | 3/1994 | Jewett et al. | 395/575 |
| 5,317,726 | 5/1994 | Horst | 395/575 |
| 5,327,553 | 7/1994 | Jewett et al. | 395/575 |
| 5,339,404 | 8/1994 | Vandling, III | 395/575 |
| 5,600,784 | 2/1997 | Bissett et al. | 395/182.1 |
| 5,615,403 | 3/1997 | Bissett et al. | 395/881 |
| 5,790,397 | 8/1998 | Bissett et al. | 364/131 |

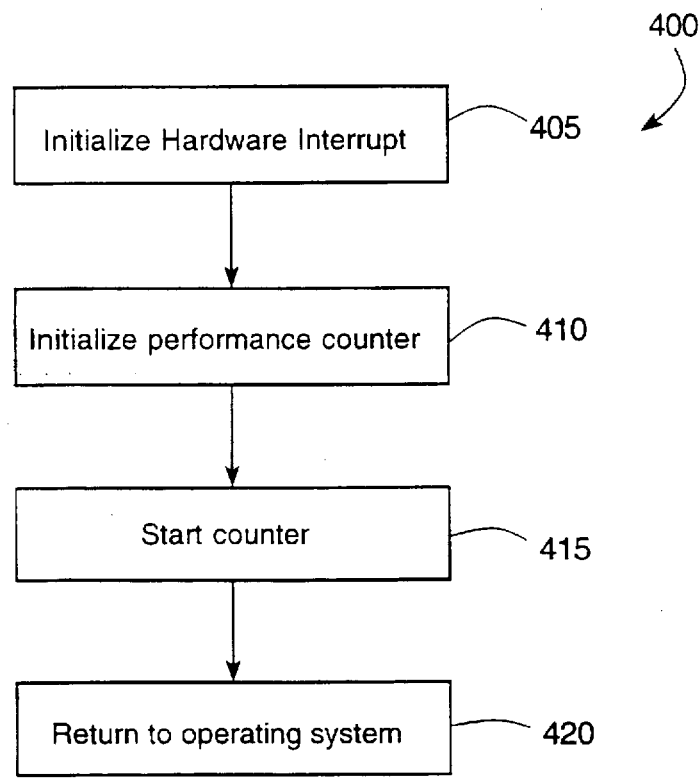
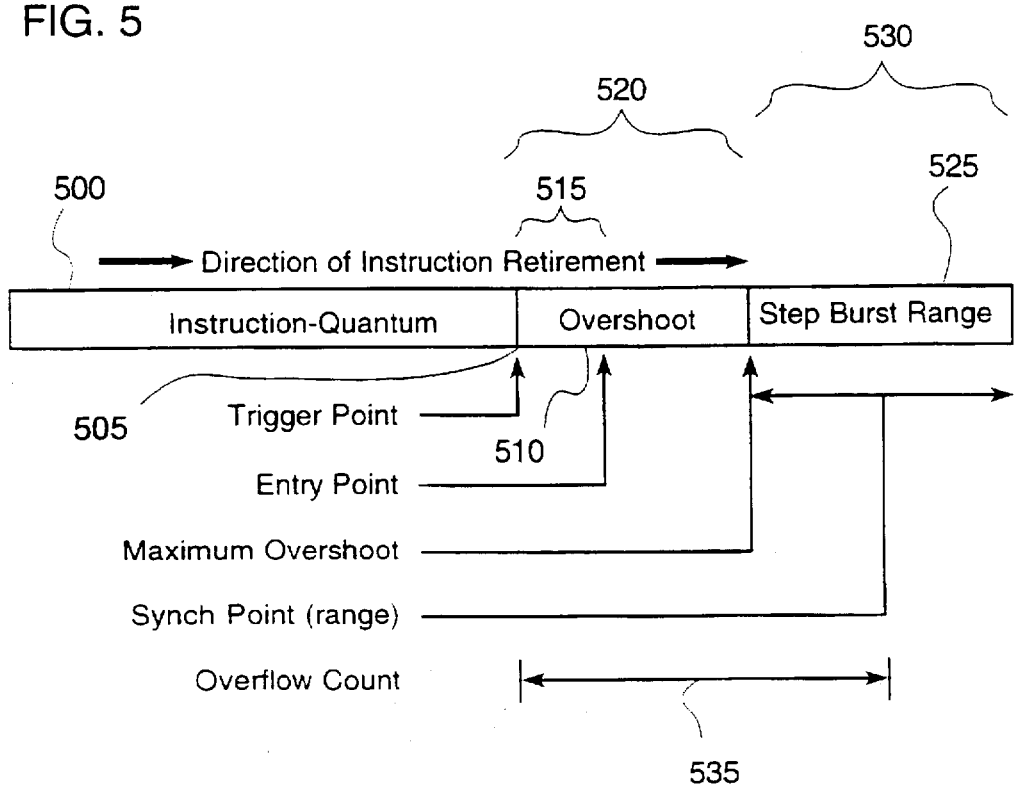

LOOSELY-COUPLED, SYNCHRONIZED EXECUTION

BACKGROUND

The invention relates to maintaining synchronized execution by loosely-coupled processors in fault resilient, fault tolerant and disaster tolerant computer systems.

Computer systems that are capable of surviving "faults," or hardware failures, generally fall into three categories: fault resilient, fault tolerant, and disaster tolerant. Fault resilient computer systems can continue to function, often in a reduced capacity, in the presence of hardware failures. These systems operate in either an availability mode or an integrity mode, but not both. A system is "available" when a hardware failure does not cause unacceptable delays in user access. Accordingly, a system operating in an availability mode is configured to remain online, if possible, when faced with a hardware error. A system has data integrity when a hardware failure causes no data loss or corruption. Accordingly, a system operating in an integrity mode is configured to avoid data loss or corruption, even if the system must go offline to do so.

Fault tolerant systems stress both availability and integrity. A fault tolerant system remains available and retains data integrity when faced with a single hardware failure, and, under some circumstances, when faced with multiple hardware failures.

Disaster tolerant systems go beyond fault tolerant systems and require that loss of a computing site due to a natural or man-made disaster will not interrupt system availability or corrupt or lose data.

For all three cases, to manage a failure of a component, there must be an alternative component which continues to function in the presence of the failure. Thus, redundancy of components is a fundamental prerequisite for a disaster tolerant, fault tolerant or fault resilient system that recovers from or masks failures. Redundancy can be provided through passive redundancy or active redundancy, each of which has different consequences.

A passively redundant system provides access to alternative components that are not associated with the current task and must be either activated or modified in some way to account for a failed component. The consequent transition may cause a significant interruption of service. Subsequent system performance also may be degraded. Examples of passively redundant systems include stand-by servers and clustered systems. The mechanism for handling a failure in a passively redundant system is to "fail-over", or switch control, to an alternative server. The current state of the failed application may be lost, and the application may need to be restarted in the other system. The fail-over and restart processes may cause some interruption or delay in service to the users. Despite any such delay, passively redundant systems such as stand-by servers and clusters provide "high availability" and do not deliver the continuous processing usually associated with "fault tolerance."

An actively redundant system provides an alternative processor that concurrently processes the same task and, in the presence of a failure, provides continuous service. The mechanism for handling failures is to compute through a failure on the remaining processor. Because at least two processors are looking at and manipulating the same data at the same time, the failure of any single component should be invisible both to the application and to the user.

Failures in systems can be managed in two different ways that each provide a different level of availability and different restoration processes. The first is to recover from failures, as in passively redundant systems, and the second is to mask failures so they are invisible to the user, as in actively redundant systems.

Systems that recover from failures employ a single system to run user applications until a failure occurs. Once a failure is detected, which may be several seconds to several minutes after the failure occurs, either by a user, a system operator or a second system that is monitoring the status of the first, the recovery process begins. In the simplest type of recovery system, the system operator physically moves the disks from the failed system to a second system and boots the second system. In more sophisticated systems, the second system, which has knowledge of the applications and users running on the failed system, and a copy of or access to the users' data, automatically reboots the applications and gives the users access. In both cases, the users see a pause in operation and lose the results of any work from the last save to the time of the failure. Systems that recover from failures may include an automatic backup feature, where selected files are copied periodically onto another system which can be rebooted if the first system fails; standby servers that copy files from one system to another and keep track of applications and users; and clusters, such as a performance scaling array of computers with a fault tolerant storage server and a distributed lock manager.

Systems that mask failures employ the concept of parallel components. At least two components are deployed to do the same job at the same time. If one should fail, the other continues. This improves overall system reliability. An example of a simple and common parallel technique places two power supplies in one system. If one power supply fails, the other keeps the system operating. More robust masking systems replicate everything in the system to make failures transparent to users for all single failures. These fault tolerant systems may detect failures in less than a second and may offer other features that facilitate constant operation, such as on-line repair and upgrade capabilities.

To provide fault tolerance, a system must uniquely identify any single error or failure, and, having identified the error or failure, must isolate the failed component in a way that permits the system to continue to operate correctly. Identification and isolation must take place in a short time to maximize continuous system availability. In addition, a redundant system must be repairable while the system continues to function, and without disrupting the applications running on the system. Finally, once repaired, the system should be able to be brought back to full functionality with minimal interruption of a user's work. Systems that do not acceptably accomplish one or more of these steps may be unable to provide continuous operation in the event of a failure.

Previous fault tolerant systems have used tightly coupled, synchronized hardware with strong support from the systems' operating system and the applications to deal with fault handling and recovery. In general, commercial fault tolerant systems use at least two processors and custom hardware in a "fail-stop" configuration as the basic building block. A typical fail-stop system runs two processors in cycle-to-cycle lockstep and uses hardware comparison logic to detect a disagreement in the outputs of the two systems. As long as the two processors agree, operation is allowed to continue. When the outputs disagree (i.e., a failure occurs), the system is stopped. Because they are operated in cycle-to-cycle lockstep, the processors are said to be "tightly coupled".

One example of a fail-stop system is a pair and spare system in which two pairs of processors running in clock cycle lockstep are configured so that each pair backs up the other pair. In each pair, the two processors are constantly monitored by special error detection logic and are stopped if an error or failure is detected, which leaves the other pair to continue execution. Each pair of processors also is connected to an I/O subsystem and a common memory system that uses error correction to mask memory failures. Thus, two processors, memory and an I/O subsystem reside in each half of the pair and spare system. The operating system software provides error handling, recovery and resynchronization support after repair.

Triple modular redundancy is another method for providing fault tolerance. In a triple modular redundant system, the results of simultaneous execution by three processors are passed through a voter and the majority result is the one used by the system. As the voter is the weak point in these systems, special attention is paid to making the voter fast and extremely reliable or multiple voters are used. The voter can be thought of as an extension of the output comparison logic in the pair and spare architecture. In general, the operating system software accounts for the voter in normal operation, as well as in recovery and resynchronization.

SUMMARY

The invention provides techniques for maintaining synchronized execution of loosely-coupled processors of a fault tolerant or fault resilient computer system. The processors operate in lockstep with respect to a quantum of instructions, referred to as quantum synchronization, but operate independently with respect to individual instructions. The processors execute identical images of a multitasking operating system, with identical initial conditions, and with redirected I/O operations. For example, the processors may be Intel Pentium Pro processors executing the Microsoft Windows NT operating system.

Each processor executes a quantum of instructions independently, at full speed, and stops at an agreed-upon point. At the stopping point, the operating states of the processors are cross checked for consistency and the system time of the processors is updated. The processors may operate in quantum synchronization indefinitely, with minimal overhead, and separated by considerable physical distances (e.g., 1.5 kilometers).

In general, the processors operating in quantum synchronization with each other are referred to as compute elements. A compute element is defined as a redundant processing engine for which sources of asynchrony have been removed by any of a number of software and hardware techniques. For a processor to constitute a viable compute element, all software-perceivable system activities that are random or asynchronous in nature must be removed, disabled, or made synchronous. For example, any input/output activity which could affect the software execution path of the processor must be eliminated or handled in some instruction-synchronous fashion. This includes activity related to I/O devices such as disks, tapes, printers, network adapters, keyboards, timers, or any other peripheral device that may lead to divergent execution between compute elements. Activities associated with most of these devices may be handled through a mechanism known as device redirection, in which the actual device is located on another system or I/O bus and is communicated with through a carefully controlled interface. Device redirection is described in U.S. application Ser. No. 08/710,404, entitled "FAULT RESILIENT/FAULT TOLERANT COMPUTING," which is incorporated by reference. The '404 application also discusses fault handling and synchronization techniques and also is incorporated for that purpose.

Some asynchronous processor-related operations do not influence software execution, and need not be disabled or otherwise addressed. Examples of such operations include background DMA, memory refresh, cache fills and writebacks, branch prediction, instruction prefetch, and data prefetch.

To ensure proper synchronization, a communication path exists between the compute elements and a common time server. The time server, upon request from software running on the compute elements, responds with a time delta that is used to update the system time of the compute elements. The communication path is high speed with low latency. All compute elements request the time delta on precisely the same instruction boundary.

The compute elements are matched in terms of their memory size, processor architecture, and I/O bus structure. Precise alignment or accuracy of system clock speeds is not necessary.

In one aspect, generally, the invention features maintaining synchronized execution by compute elements processing instruction streams in a computer system including the compute elements and a controller (e.g., an I/O processor), and in which each compute element includes a clock that operates asynchronously with respect to clocks of the other compute elements. Each compute element processes instructions from an instruction stream (e.g., application and/or operating system software) and counts the instructions processed. The compute element initiates a synchronization procedure upon processing a quantum of instructions from the instruction stream. After initiating the synchronization procedure, the compute element continues to process instructions from the instruction stream and to count instructions processed from the instruction stream. The compute element halts processing of instructions from the instruction stream after processing an unspecified number of instructions from the instruction stream in addition to the quantum of instructions. Upon halting processing, the compute element sends a synchronization request to the controller and waits for a synchronization reply from the controller.

Embodiments of the invention may include one or more of the following features. After initiating the synchronization procedure, each compute element may continue to process instructions by single-stepping through the instructions under control of the synchronization procedure. In particular, the compute element may single-step through at least a specified number of instructions associated with permitted asynchronous activities of the compute element. The permitted asynchronous activities may include background DMA, memory refresh, cache fills and writebacks, branch prediction, instruction prefetch, and data prefetch. The specified number of instructions is determined empirically for a type of processor associated with the compute elements.

When an instruction disables interrupts, the synchronization procedure may permit the compute element to continue to process instructions from the instruction stream at full speed until interrupts are re-enabled. Similarly, when a repeat instruction is encountered, the synchronization procedure may permit the compute element to continue to process instructions at full speed until an instruction following the repeat instruction is encountered.

The synchronization procedure may be initiated by generating an interrupt that calls the synchronization procedure. The interrupt may be generated when a performance counter of the compute element indicates that the quantum of instructions has been processed. The performance counter may be disabled when processing instructions other than instructions from the instruction stream, such as instructions of the synchronization procedure.

The synchronization request may include information about the state of the compute element. The controller, upon receiving synchronization requests from each compute element, may cross-check information from the synchronization requests about the states of the compute elements for consistency. The controller then sends the synchronization reply upon determining that the states of the compute elements are consistent. The controller activates a fault handler upon determining that the states of the compute elements are inconsistent.

The controller may include a time-of-day update in the synchronization reply. Upon receiving the synchronization reply, the compute elements may update their clocks based on the time-of-day update. The compute elements also may repeat the procedure for another quantum of instructions.

When an instruction from the instruction stream makes a request from an input/output device, the request may be redirected to the controller (i.e., the I/O processor). The controller receives the redirected request from the compute element, processes the request, and returns the results of the request to the compute elements.

Each compute element may include an Intel Pentium Pro processor. The stream of instructions may be associated with application and operating system software, such as unmodified, Microsoft Windows NT operating system software. A disaster tolerant system may be formed by separating the compute elements by large distances (e.g., one hundred meters or more) to prevent a local disturbance from harming more than one compute element.

Other features and advantages will become apparent from the following description, including the drawings, and from the claims.

BRIEF DESCRIPTION OF THE DRAWINGS

FIGS. 4, 6 and 6A are flow charts of procedures implemented by software of the systems of FIGS. 1–3.

FIG. 5 is a graph showing timing of events occurring in the systems of FIGS. 1–3.

DESCRIPTION

Figure 1:
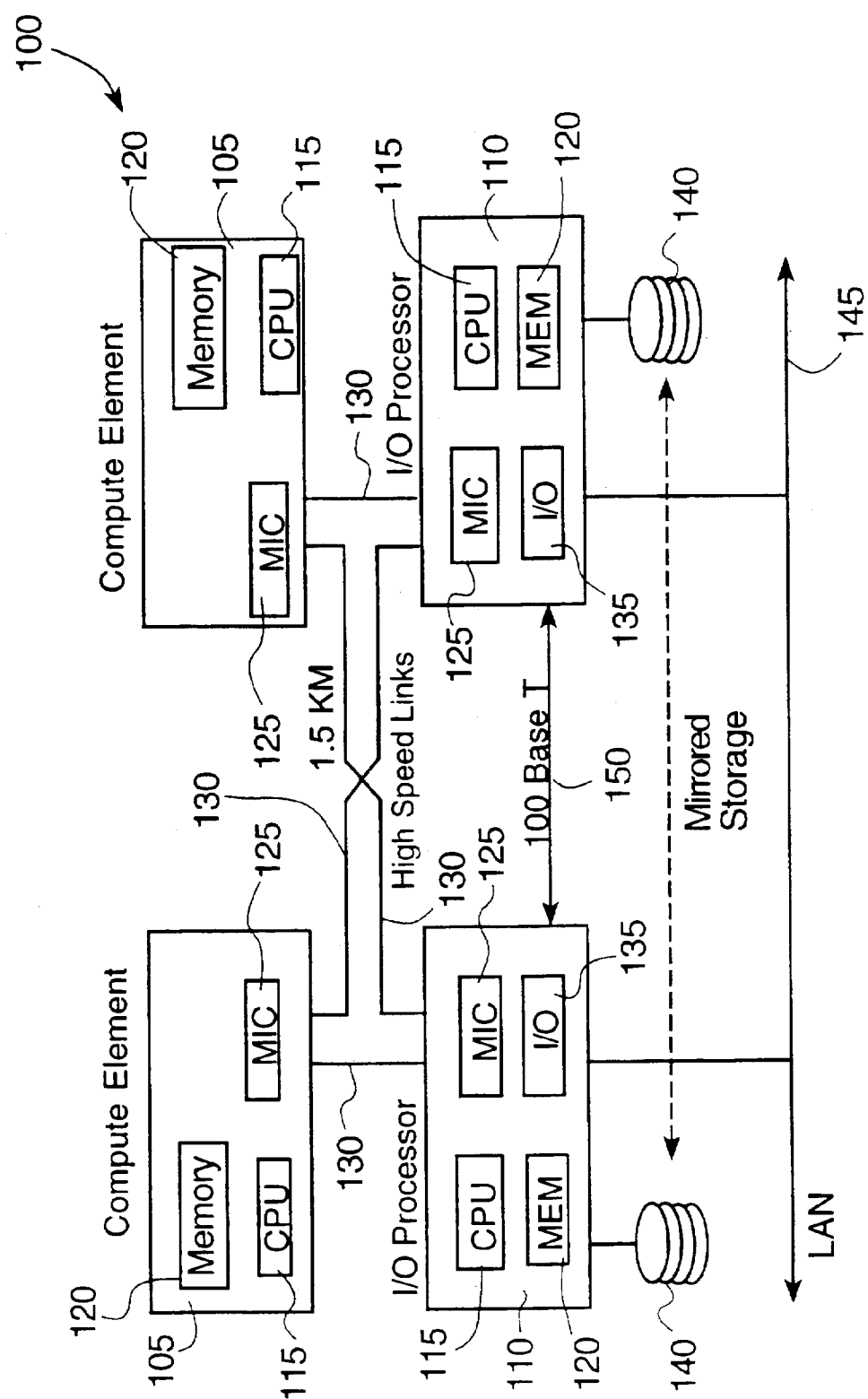
FIGS. 1–3 are block diagrams of fault tolerant computer systems.

Referring to FIG. 1, a fault tolerant system 100 is configured to allow examination and comparison of the results of computations within the normal execution process, and to do so transparently to both operating system and application software. In general, all computer systems perform two basic operations: (1) manipulating and transforming data, and (2) moving the data to and from mass storage, networks, and other I/O devices. The system 100 divides these functions both logically and physically, between two separate processors. For this purpose, each half of the system 100, called a tuple, includes a compute element 105 and an I/O processor 110. The compute element 105 processes user application and operating system software, while the I/O processor 110 processes I/O requests generated by the compute element 105 and controls synchronization of the compute elements.

The system 100 uses a software-based approach in a system configuration based on inexpensive, industry standard processors. For example, the compute elements 105 and I/O processors 110 may be implemented using Intel Pentium Pro processors. The system may run unmodified, industry-standard operating system software, such as Microsoft's Windows NT, as well as industry-standard applications software. This permits a fault tolerant system to be configured by combining off-the-shelf, Intel Pentium Pro-based servers from a variety of manufacturers, which results in a fault tolerant or disaster tolerant system with low requisition and life cycle costs.

Each compute element 105 includes a processor 115, memory 120, and an interface card 125. The interface card 125 contains drivers for communicating with two I/O processors simultaneously, as well as comparison and test logic that assures results received from the two I/O processors are identical. In the fault tolerant system 100, the interface card 125 of a compute element 105 is connected by high speed links 130, such as fiber optic links, to interface cards 125 of the two I/O processors 110.

Each I/O processor 110 includes a processor 115, memory 120, an interface card 125, and I/O adapters 135 for connection to I/O devices such as a hard drive 140 and a network 145. In the fault tolerant system 100, the interface card 125 of an I/O processor 110 is connected by high speed links 130 to the interface cards 125 of the two compute elements 105. In addition, a high speed link 150, such as a private ethernet link, is provided between the two I/O processors 110.

All I/O task requests from the compute elements 105 are redirected to the I/O processors 110 for handling. As an application, the I/O processor 110 runs specialized software that handles all of the fault handling, disk mirroring, system management and resynchronization tasks required by the system 100. By using a multitasking operating system, such as Windows NT, the I/O processor 110 may run other, non-fault tolerant applications. In general, a compute element may run Windows NT Server as an operating system while, depending on the way that the I/O processor is to be used, an I/O processor may run either Windows NT Server or Windows NT workstation as an operating system.

The two compute elements 105 run quantum synchronization software, also referred to as lockstep control software, and execute the operating system and the applications in quantum lockstep. Disk mirroring takes place by duplicating writes on the disks 140 associated with each I/O processor. If one of the compute elements 105 should fail, the other compute element 105 keeps the system running with a pause of only a few milliseconds to remove the failed compute element 105 from the configuration. The failed compute element 105 then can be physically removed, repaired, reconnected and turned on. The repaired compute element then is brought back automatically into the configuration by transferring the state of the running compute element to the repaired compute element over the high speed links and resynchronizing. The state of the operating system and applications are maintained through the few seconds it takes to resynchronize the two compute elements so as to minimize any impact on system users.

If an I/O processor 110 fails, the other I/O processor 110 continues to keep the system running. The failed I/O processor then can be physically removed, repaired and turned back on. Since the I/O processors are not running in lockstep, the repaired system may go through a full operating system reboot, and then may be resynchronized. After being resynchronized, the repaired I/O processor automatically rejoins the configuration and the mirrored disks are re-mirrored in background mode over the private connection 150 between the I/O processors. A failure of one of the mirrored disks is handled through the same process.

The connections to the network 145 also are fully redundant. Network connections from each I/O processor 110 are booted with the same address. Only one is allowed to transmit messages while both receive messages. In this way, each network connection monitors the other through the private ethernet. Should either network connection fail, the I/O processors will detect the failure and the remaining connection will carry the load. The I/O processors notify the system manager in the event of a failure so that a repair can be initiated.

While FIG. 1 shows both connections on a single network segment, this is not a requirement. Each I/O processor's network connection may be on a different segment of the same network. The system also accommodates multiple networks, each with its own redundant connections. The extension of requires to disaster tolerance requires only that the connection between the tuples be optical fiber or a connection having compatible speed. With such connections, the tuples may be spaced by distances on the order of one mile. Since the compute elements are synchronized over this distance, the failure of a component or a site will be transparent to the users.

Figure 2:
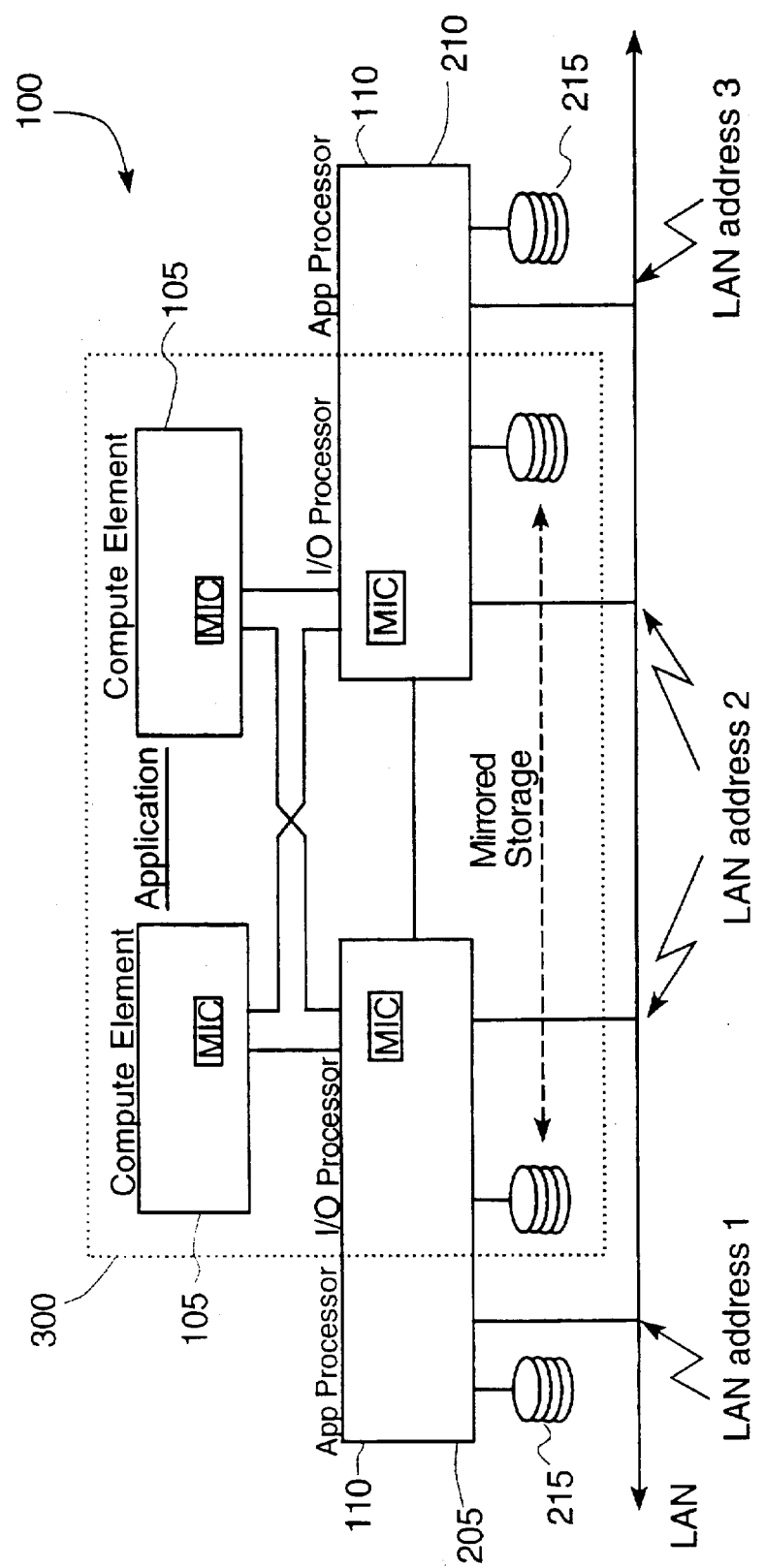

A feature of the system 100 is that the I/O processors may run other applications while servicing the I/O requirements of the compute elements. This leads to a different representation of the system as shown in FIG. 2, in which the fault tolerant portion 200 of the system runs a first application, and the I/O processors 110 run, respectively, a second application 205 and a third application 210 in a non-fault tolerant mode using separate disks 215. For example, the I/O processors 110 may serve, respectively, as a print server and a backup server. The two compute elements 105 each contain only a processor, memory and a network connection, and together cost about as much as a full server. The cost of each I/O processor 110 corresponds to the cost of a server. As such, the cost of the system corresponds to the cost of three servers, while the system provides the functionality of three servers. Accordingly, the benefits of fault tolerance may be obtained with essentially no additional hardware costs.

Figure 3:
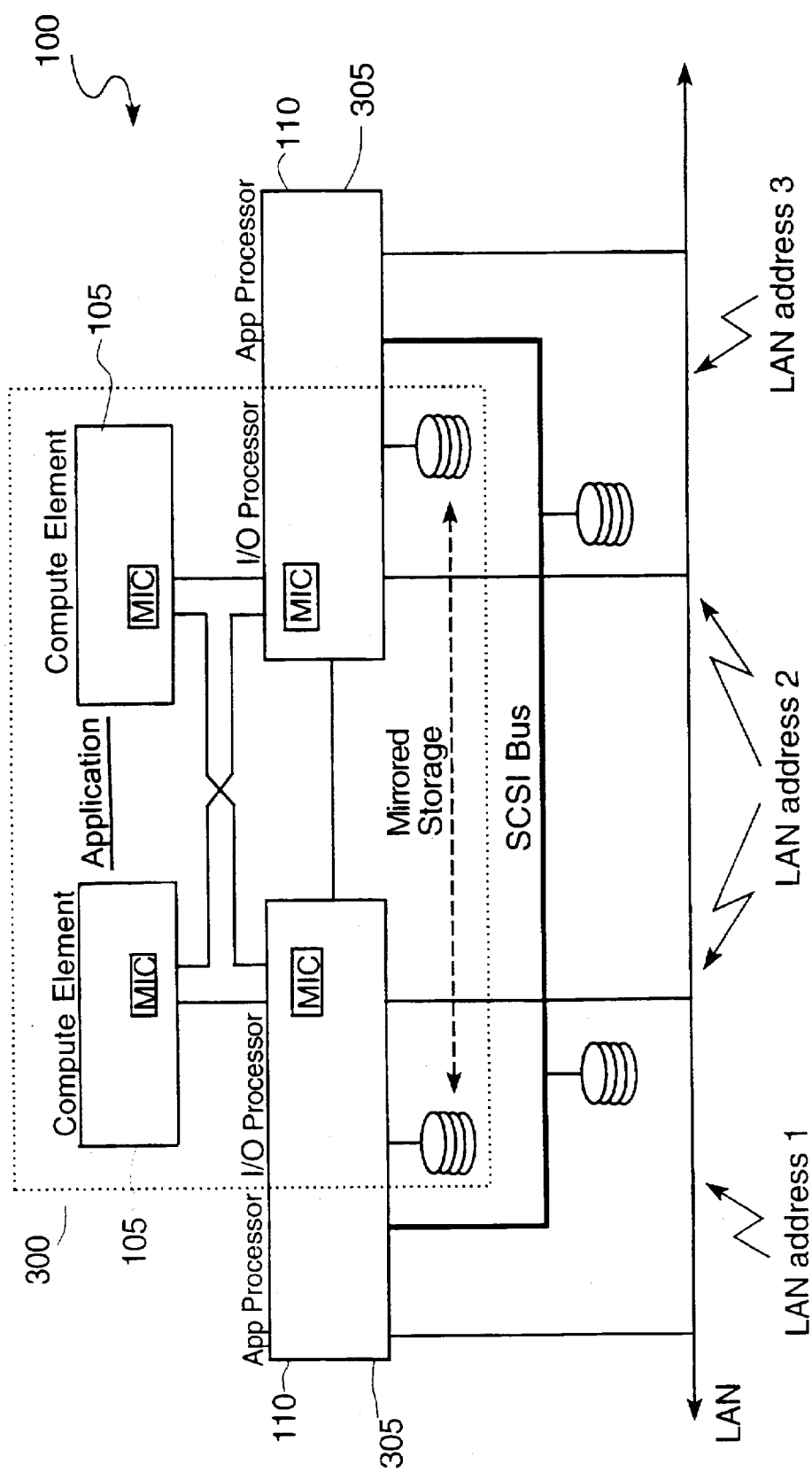

In addition, as shown in FIG. 3, the I/O processors can be clustered and used to run applications that require high availability only, while the fault tolerant portion of the system 300 runs applications that require fault tolerance. This configuration may be used, for example, with the I/O processors acting as web page servers 305 while internet commerce takes place on the fault tolerant part of the system. As another alternative, one of the I/O processors can serve as a network firewall while the other handles web pages.

From a system management perspective, a fault tolerant system has three states: operational, vulnerable, and down. Unlike the down state, because the vulnerable state is invisible to users, alternate means must be provided for notifying the system manager so that a repair/resynchronization cycle can be initiated. Three vulnerable state notification methods may be provided. The first presents a graphical model similar to FIG. 1 on a system console or on remote systems over the network or through a serial line to the manager. The components are shown in colors that represent their states, and a point and click interface is used to examine and manage system components. The second method uses an event log, such as the Windows NT Event Log into which all system events are logged. Several third-party tools are available which make use of the Event Log to communicate specified events to the system manager using pagers, fax, e-mail or other means. Finally, the third method incorporates an electromagnetic relay into the system. The relay can be connected to a standard building alarm system and monitored by the building alarm monitoring service. The relay will activate when an event indicating a vulnerable state is present.

As noted above, the compute elements 105 may be implemented using Pentium Pro processors. A processor of this type provides several features that are useful in implementing quantum synchronization. In particular, the processor guarantees in-order instruction retirement, and provides a programmable performance counter that is capable of counting instructions retired by the processor. The performance counter can be programmed with a terminal count that, when reached, directs a maskable interrupt to the processor. The performance counter continues to count instructions retired even after the terminal count has been reached. In addition, the counter can be synchronously stopped and started by software. The maskable interrupt triggered by the terminal count may be posted under software control and directed to the processor through a specific interrupt vector. Other useful features of the Pentium Pro processor include the ability to single-step the processor through instructions under software control, the ability to define an address at which the processor initiates a breakpoint trap, and the ability to task-switch to an interrupt or trap handler that executes on its own stack. Having these features built into the processor eliminates the need for additional external circuitry. This allows quantum synchronization to be applied to standard Pentium Pro system configurations without hardware alteration or customization.

To ensure proper synchronization, the operating system may not make use of the performance counter features noted above, and may not implement an idle loop or interrupt-wait code using halt instructions. Otherwise, the operating system is unconstrained. Microsoft's Windows NT operating system meets these requirements.

When the system 100 is initialized, controlling software is loaded by the operating system as part of the normal device driver initialization sequence. The first software to be loaded by the operating system, referred to as the synchronization startup software, is related to quantum synchronization of the compute elements.

The synchronization startup software operates according to the procedure 400 illustrated in FIG. 4. First, the synchronization startup software initializes the hardware interrupt vector for the maskable interrupt that will be used for performance counter overflow (step 405). The software initializes this vector as a task gate that causes the processor to perform a task switch to lockstep control software upon entry through the vector. Next, the synchronization startup software initializes the performance counter to count instructions retired, beginning at the negated quantum-instruction count, and to generate the maskable interrupt when overflow occurs (step 410). Finally, the synchronization startup software starts the counter (step 415) and returns control to the operating system's initialization code (step 420).

It is important to note that the synchronization software maintains a separate memory stack that is independent from the stack used by applications or operating system software.

The stack associated with the synchronization software may vary from compute element to compute element without affecting synchronized operation of the compute elements. To account for this, the portions of memory 120 associated with the synchronization software stack are not examined when comparing the memories of the compute element to detect divergence between the compute elements.

Referring to FIG. 5, each time that the processor completes its instruction quantum 500, the performance counter logic generates a maskable interrupt. The exact instant of counter overflow (i.e., the instant at which the interrupt is generated) is referred to as the trigger point 505. The maskable interrupt is generated at the trigger point and propagates to the processor. The processor services the maskable interrupt some number of instructions later at a time referred to as the entry point 510. The exact time, or number of instructions, between the trigger point and the entry point is unpredictable and will vary from processor to processor. This is due to asynchronous activities occurring below the instruction-visible processor state, such as memory refresh, DMA and system cache contention (with orchestrated or synchronous devices), and processor prefetch or pipeline operations. Because of this asynchrony, compute elements often will service the same trigger point interrupt on different instruction boundaries beyond the trigger point.

The time between the trigger point 505 and the entry point 510 is referred to as overshoot 515. The maximum possible overshoot 520 may be determined empirically for a given processor type. The sum of the instruction-quantum 500 and the maximum overshoot 520 determine the minimum instruction count that the compute elements 105 must complete to achieve quantum synchronization with each other. The point at which quantum synchronization occurs is referred to as the synch point 525. The synch point may fall within a range 530 that extends from the maximum overshoot 520. The overflow count 535 is the actual number of instructions executed from the trigger point 505 to the synch point 525.

In working toward the synch point, only instructions associated with application or operating system software are counted. This is achieved by disabling the performance counter when processing instructions associated with the lockstep control software so that those instructions are not counted.

Figure 6:
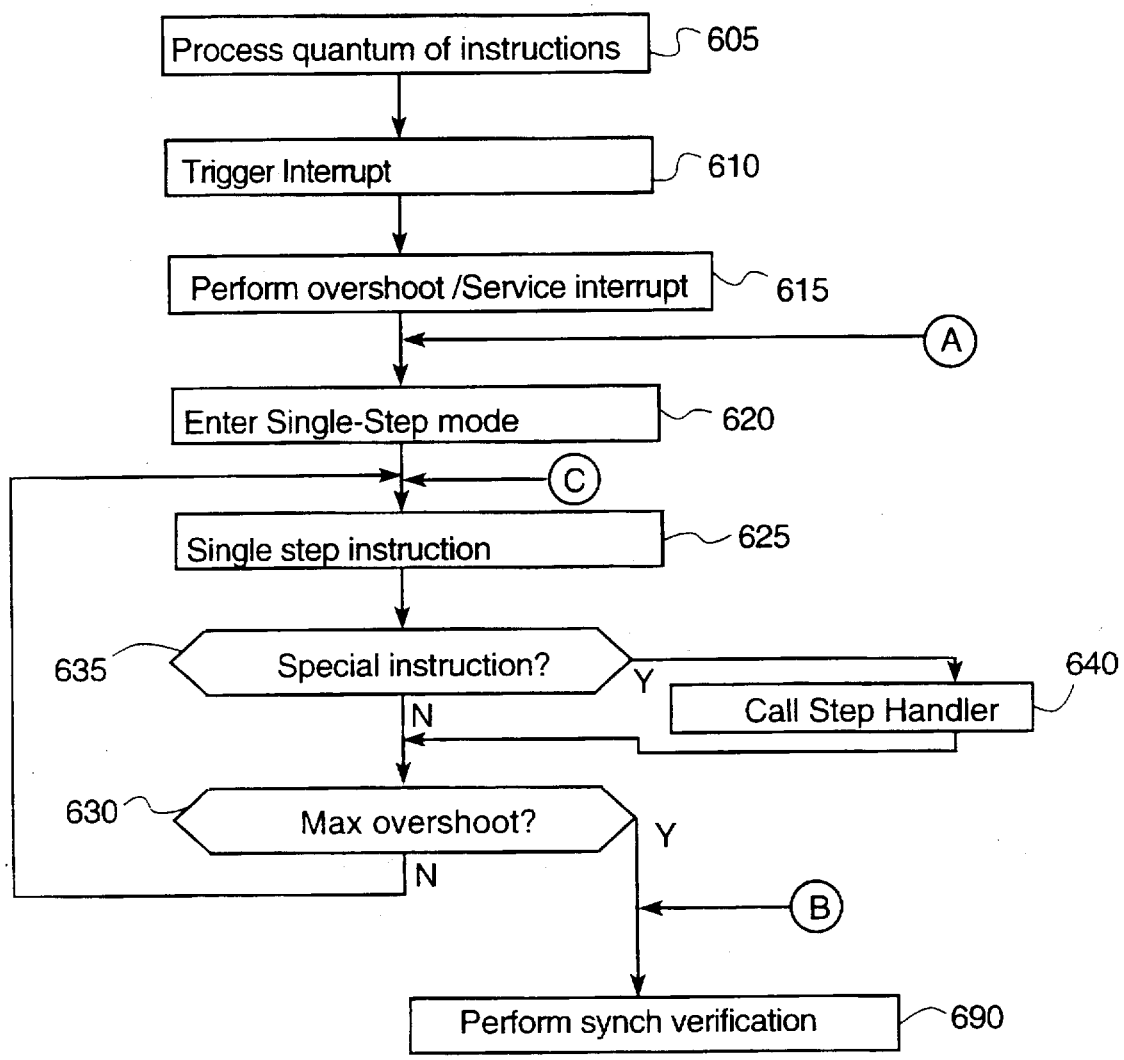

Referring to FIG. 6, the lockstep control software controls the compute elements to achieve quantum synchronization according to a procedure 600. Initially, a compute element processes the designated quantum of instructions (step 605). When the performance counter reaches the trigger point (i.e., when the quantum of instructions has been performed), a negative to positive (zero-crossing) transition of the performance counter occurs and triggers the maskable interrupt (step 610).

After the maskable interrupt is triggered, the compute element performs overshoot instructions until the entry point is reached and the compute element services the maskable interrupt (step 615). Usually, when interrupts are enabled, a compute element will service the maskable interrupt at an entry point that is just a few instructions beyond the trigger point. However, the compute element may not service the maskable interrupt for extended periods of time if the compute element has disabled interrupts from disturbing order-critical code. This is desirable, and represents the main reason for using a maskable interrupt, since an operating system may be intolerant of interrupts at certain points during its execution. Eventually, typically within just a few instructions, interrupts are re-enabled, the entry point is reached, and the maskable interrupt is serviced.

Once at the entry point, the lockstep control software uses a combination of single-stepping, instruction-bursting, and breakpoint-bursting to advance the instruction count to a value greater than or equal to the maximum overshoot. Initially, the compute element enters single-step mode (step 620) and single steps through the instructions (step 625) until the maximum overshoot instruction count is reached (step 630). As noted above, the compute element disables the performance counter when processing instructions associated with the lockstep control software.

When single-stepping toward the maximum overshoot instruction count, an instruction or exception that requires special post-step attention may be encountered (step 635). If this occurs, the lockstep control software calls a step handler (step 640). The lockstep control software also could parse ahead and determine if an instruction about to be stepped will cause an exception or other side-effect, but that could become complicated and add considerable overhead to the step time. In general, dealing with instruction side-effects after they have stepped is the more efficient approach.

Figure 6A:
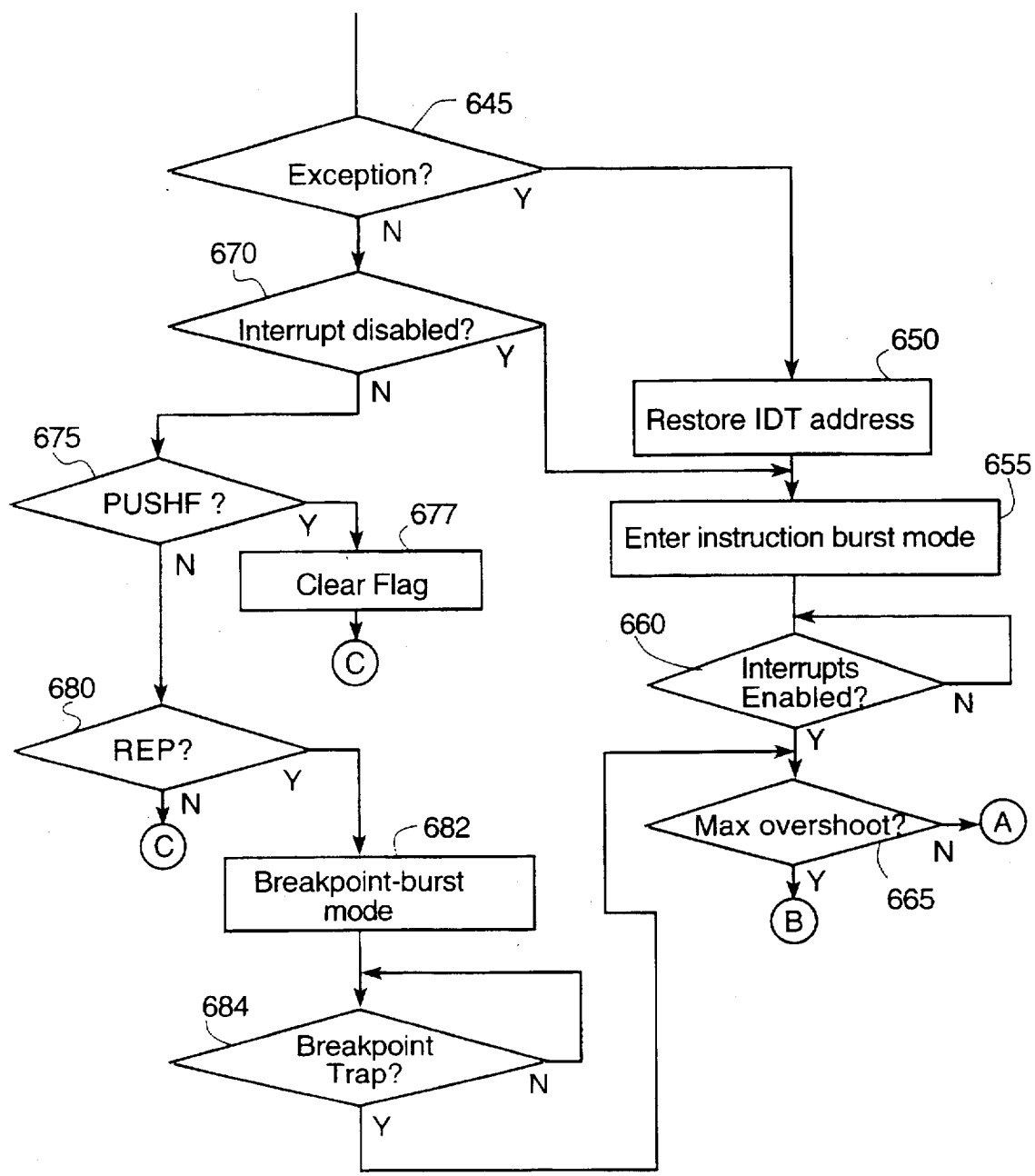

Referring to FIG. 6A, the step handler deals with exceptions (step 645) such as page faults, general protection faults, and system calls (e.g., INT). These exceptions cause the processor to vector through the interrupt dispatch table (IDT) and begin executing the operating system's interrupt dispatcher. When single-stepping toward the maximum overshoot instruction (i.e., when entering single step mode in step 620), the lockstep control software replaces the base pointer of the IDT with a pointer that hooks all vectors. This allows the single-step code to catch any of the 256 potential exceptions without having to parse the instruction stream to predict all exceptions. Interrupts are automatically disabled by the compute element when an exception occurs. Once the special IDT catches an exception, the step handler restores the operating system IDT address (step 650) and enters instruction-burst mode (step 655).

In instruction burst mode, the processor is permitted to run at full speed until interrupts are re-enabled (step 660). Instruction bursting involves posting a self-directed maskable interrupt and allowing the processor to run at full speed until interrupts are re-enabled by a STI or IRET instruction. The compute element synchronously evaluates the presence of the posted interrupt at the time of these enabling instructions, and will dispatch through the maskable vector in a predictable, consistent manner. If operation in the instruction-burst mode advances the instruction counter beyond the maximum overshoot count (step 665), the instruction following re-enabling of interrupts becomes the synch point. Otherwise, the compute element reenters single-step mode (step 620).

The step handler also handles any other instructions or events that disable interrupts (step 670). Such instructions, which may be identified by testing EFLAGS.IF of the Pentium Pro processor following the single step, are potentially unsafe to step through. Accordingly, the step handler uses instruction-burst mode (step 655) to handle these instructions.

The step handler also handles the PUSHF instruction (step 675), which pushes a copy of EFLAGS onto the stack. EFLAGS includes a copy of the trace-step flag (EFLAGS.TF). This flag is set during single-stepping toward the maximum overshoot count. The step handler clears this flag from the operating system's and application's stacks (step 677) to avoid stack divergence or an unexpected trap caused by a subsequent POPF.

The step handler also handles the repeat (REP) instruction (step 680). Single-stepping a repeat instruction causes only one iteration of the instruction to occur with no advancement of the instruction retirement count. For most repeat instructions, this would cause an unacceptably long single-step time. The step handler addresses this by switching to breakpoint-burst mode (step 682). In breakpoint-burst mode, one of the compute element's breakpoint registers is configured to cause a synchronous breakpoint trap when the instruction following the repeat instruction is fetched, but not yet executed, and the compute element is allowed to run at full speed until the breakpoint trap occurs (step 684). Unlike instruction-burst mode, breakpoint-burst mode requires IDT base address replacement to catch any exceptions (other than the breakpoint trap) that occur during the repeat instruction. An additional consideration with respect to the repeat instruction is that some processors (e.g., the Pentium Pro P6) fail to count the repeat instruction as a retired instruction if the final cycle of the repeat instruction is single stepped. The step handler must detect this case and adjust the retirement counter accordingly.

Using the combination of single-stepping and burst modes, the compute element continues to retire instructions until the instruction counter reaches or surpasses the maximum overshoot count (i.e., until the synch point is reached). Each compute element reaches the synch point at the same instruction boundary.

The instruction quantum value is a constant that may be determined by measurement at system initialization time or by other means. For system efficiency, the value should consume a period of processing time much larger than the typical processing time required to step and burst to the synch point. To provide smooth time updates, the value also should be less than the operating system's timer interval, which is typically on the order of ten milliseconds.

Referring again to FIG. 6, once at the synch point, all compute elements perform a synch verification with a remote time server, which is implemented redundantly by the I/O processors (step 690). This exchange allows the time server to verify that all compute element are in precise state alignment. Along with a time update request, the compute elements transmit check values representative of their current instruction pointer, register content, and EFLAGS value. In addition, each compute element sends its overflow count value, which is an important divergence indicator. The overflow count confirms that each compute element executed the same number of instructions to reach the synch point. Any divergence detected is reported to the system fault handler, which uses this information along with other failure indicators to select one or more processors to be disabled. The remaining compute elements are allowed to continue within a matter of milliseconds. Fault handling is described in U.S. application Ser. No. 08/710,404, entitled "FAULT RESILIENT/FAULT TOLERANT COMPUTING," which is incorporated by reference.

The exchange with the time server also serves to bring all of the compute elements into real-time alignment. As the time server receives update requests, it does not respond with a delta time until each of the compute elements has made a request. This causes the faster compute element to stall while waiting for the slower compute element, which may have slowed due to memory contention or other reasons, to catch up. The time server validates the state of both of the compute elements before returning the same delta time update to each compute element as a broadcast response.

The exchange also allows the time server to detect when a compute element has failed completely, as determined by the lack of a time update request within a short time of receiving requests from the other compute element. This timeout can be relatively small, in the range of a single instruction quantum period plus overhead (typically milliseconds). A lost compute element may result from any of a number of failures, including power failure, processor reset, operator intervention, memory corruption, and communication adapter failure. Information regarding a compute element failure is passed to the system fault handler.

Finally, the exchange allows the time server to return a delta-time update that is converted to a number of clock ticks to be injected into each compute element. Clock timer ticks can be injected safely only when the processors reach the synch point. Actual injection of time should be delayed until the final return to the interrupted operating system or application. This allows a single tick to be injected in the context of the interrupted code by building the appropriate IRET frame on the stack and jumping to the operating system's timer tick handler, which will process the tick and return directly to the operating system or application code.

The latency of a round-trip time update exchange is critical to the performance of the compute elements, more so than the single-step and burst operations needed to reach the synch point. Having efficient communication interfaces and protocol layers are as important as the speed and distance of the physical link. A round-trip time much less than the typical ten millisecond operating system timer interval is essential for good performance of the compute elements.

As indicated above, the performance counter must not be allowed to diverge due to the processing of the lockstep control code, which is divergent by nature of the imprecise entry point. Each time that the divergent lockstep control code is executed, it must stop the performance counter and compensate the counter for all entry and exit instructions introduced by the lockstep code, to nullify the effect that it has had on the counter. This includes all entries due to the maskable interrupt, single-step cycles, and burst re-entries. In this way, the presence of the lockstep control code is not visible to the performance counter.

Task switching is necessary at the maskable interrupt, single-step, and breakpoint-burst entry points to the lockstep control software. Task switching is accomplished through the use of task-gates located in the system IDT. These entries are potentially divergent among compute elements. When a task switch occurs, the majority of the processor state is saved in a defined structure, and the new state is restored from a target task structure. A task switch is the only method offered in the Pentium Pro processor that guarantees a stack switch.

The stack switch associated with task switching ensures that application and operating system stacks will not be affected by an inconsistent footprint caused by the imprecise delivery of the trigger point interrupt at the entry point. Stack preservation is essential to avoiding divergence of paging file contents as well as to avoid inducing instruction divergence through the use of poor programming practices such as using uninitialized stack variables.

However, task switching introduces divergence in processor control registers that must be accounted for. Specifically, the CR0 processor register contains a Task Switched flag that is set whenever a task switch occurs, including a task switch into or out of the lockstep control code. This may create divergence in CR0 that could find its way into general purpose processor registers, potentially causing instruction divergence or a state validation (cross check) failure, or the divergence could be moved onto the application or operating system stack. In addition, the operating system will not expect to see this important processor state bit asserted other than when it should be asserted, so the effects on CR0.TS must somehow be repaired. A check is made to determine if CR0.TS already was set prior to the task switch into the lockstep control task. If it was, then no special cleanup of CR0.TS is needed and the standard IRET/task switch can be used.

Figure 7:
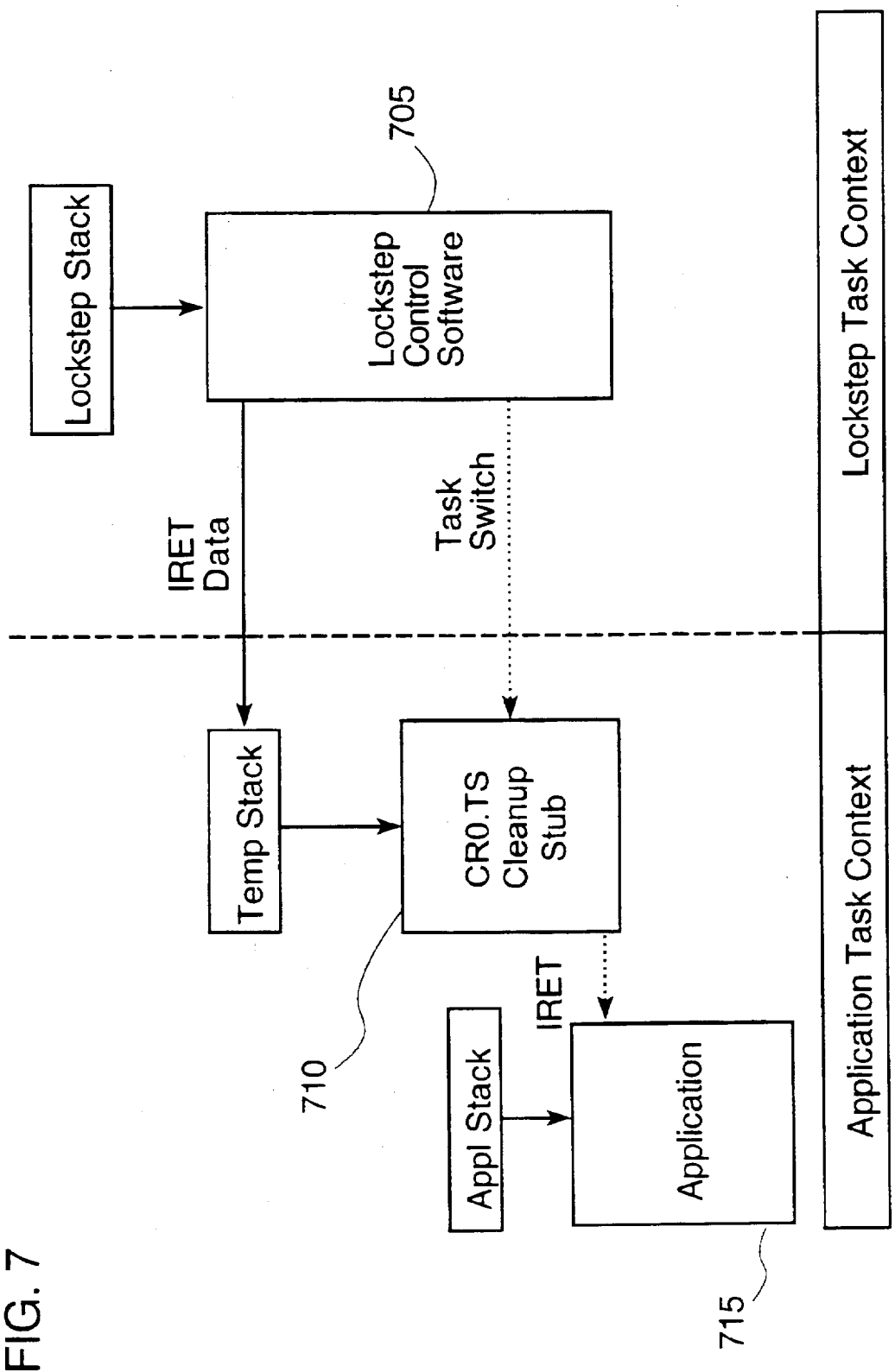
FIG. 7 is a block diagram illustrating flag updating.

When the CR0.TS flag must be cleared, the approach taken depends on the mode to which the processor is returning. The IRET instruction will restore a stack pointer along with the instruction pointer and EFLAGS when returning to ring 1, 2, 3, or V86 mode. Hence, returning to non-kernel mode software and clearing the CR0.TS flag involves two steps: first, returning to the application task context to clear CR0.TS from a stub routine, and second, restoring register state and IRET back to the application code, possibly with the single step flag asserted. This process is illustrated in FIG. 7. By using a cleanup stub 705 to complete the transition from the lockstep control software 710 back to the application 715, the state of the CR0 register can be restored, while preserving the ability to use the single-step feature of the processor through the IRET instruction.

Returning from the lockstep control task to an interrupted kernel thread is slightly more complicated. Avoiding modifications to the kernel stack and clearing the CR0.TS flag are important, but IRET will not restore the stack pointer when returning from kernel mode to kernel mode. This requires three separate stub routine variations. First, if the CR0.TS bit does not need to be cleared because it already was set, the standard IRET/task switch mechanism is used. Second, if CR0.TS must be cleared, but no single-step operation is needed, IRET does not need to be used, and the stack pointer may be restored with a MOV instruction, clear CR0.TS, and JP to the interrupted address. Finally, when CR0.TS must be cleared and a single-step operation is needed, an IRET cannot be used to restore the stack pointer, and a processor breakpoint must be set at the address following the instruction to be "stepped". The stub then may clear CR0.TS, restore the stack pointer using a MOV instruction, and JMP to the instruction to be stepped. Since the IDT address has been replaced to catch exceptions, any failure to reach the breakpoint will be detected and handled. In this case, the length of the target instruction must be determined, and during this parsing checks must be made to ensure that the virtual valid. If the instruction are valid. If any are invalid, a page fault is guaranteed and the breakpoint is not needed.

Any faults, exceptions, or other vectors through the IDT must be intercepted to avoid losing control of the lockstep mechanism. This vectoring typically occurs from page faults, general protection faults, and system calls, all of which are instruction-synchronous events. As such, they do not diverge the instruction flow between compute elements and thus do not require a task switch to enter the IDT catcher setup by the single-step and breakpoint-burst mechanisms. The IDT catcher is allowed to intercept the vectoring processor in the context of the OS kernel, but must be careful not to push divergent data onto the kernel stack that might cause divergence at a later time. Lockstep control state is updated by the IDT catcher, and because processor interrupts will have been disabled during the vectoring phase, the IDT catcher can assume that a maskable interrupt will be needed to cause re-entry into the lockstep control task at the next opportunity. By avoiding the task switch, the IDT catcher easily can locate the actual target handler address and jump to that handler with the precise context of the original exception on the stack. This is a standard technique for interrupt chaining.

Communication with the remote time server or with servers of redirected I/O devices requires interactions with communication devices attached to the compute element. Such device interactions are by nature divergent as register states are polled and completion conditions are detected. Care must be taken when interacting with these devices to avoid perturbing the instruction quantum. This is not possible without provisions built into the lockstep control software to allow synchronized pausing and resuming of the instruction counter and maskable interrupt.

Any software driver that interacts with a compute element's communication devices is supplied as a component of the overall lockstep control software. This allows such drivers to synchronize their actions with the state of lockstep control, thereby avoiding unpredictable effects on the instruction execution profile.

When compute elements need to perform what is known as divergent processing, they can pause the lockstep mechanism to hide the effects of divergent processing. The lockstep mechanism may be paused by disabling interrupts, which blocks the maskable interrupt and causes the single-step handler to enter instruction burst mode. The performance counter is stopped to suspend the counter from advancing and preserve its current count value. Next, a global "paused" flag is set to notify the lockstep control software that pause mode has been entered. Interrupts then are enabled. If the lockstep control software (single-step handler) was single stepping at the time of entering this routine, then the lockstep control software would have transitioned to instruction burst mode and the maskable interrupt would have been serviced immediately after enabling interrupts. However, the global "paused" flag prevents the lockstep control software from affecting any state. Finally, the divergent code is executed.

Once divergent processing has completed, the lockstep mechanism must be resumed. This is done differently depending on the globally visible state of the lockstep mechanism. First, interrupts are disabled. If the lockstep control software is in instruction-burst mode, the self-directed maskable interrupt is posted. The divergent state then is cleared. Registers and processor flags may contain divergent data which cannot be carried across into the lockstepped instruction stream. All general registers and processor flags (EFLAGS) which may carry divergent data are cleared. The Pentium Pro translation buffer then is flushed to avoid page fault divergence. The translation buffer contents may become divergent during the divergent processing which preceded the resumption of lockstep operation. Next, the global "paused" flag is cleared. The performance counter then is started at the point it was stopped. Finally, interrupts are enabled.

Figure 8:
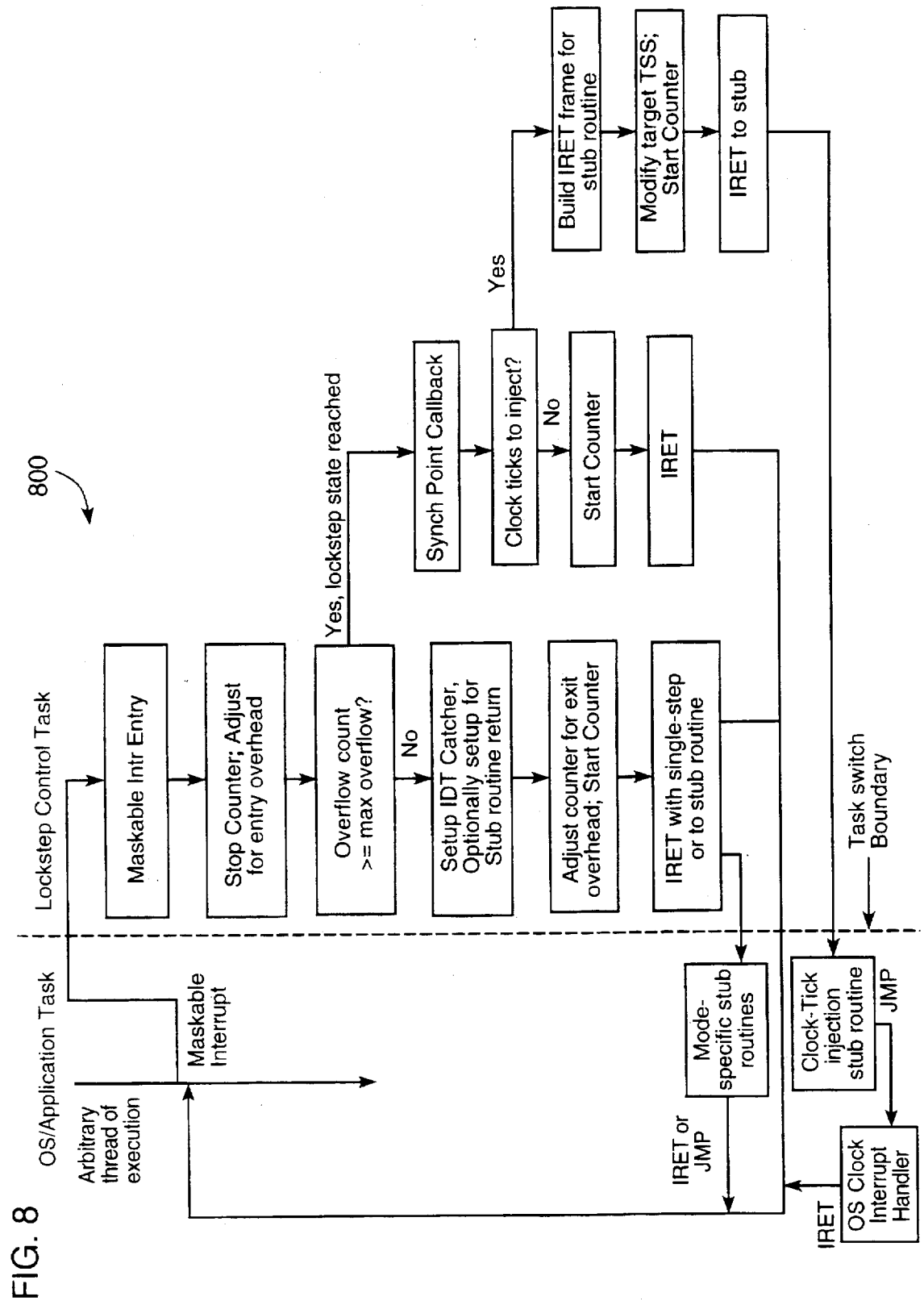
FIGS. 8–10 are flow charts of procedures implemented by software of the systems of FIGS. 1–3.
Figure 9:
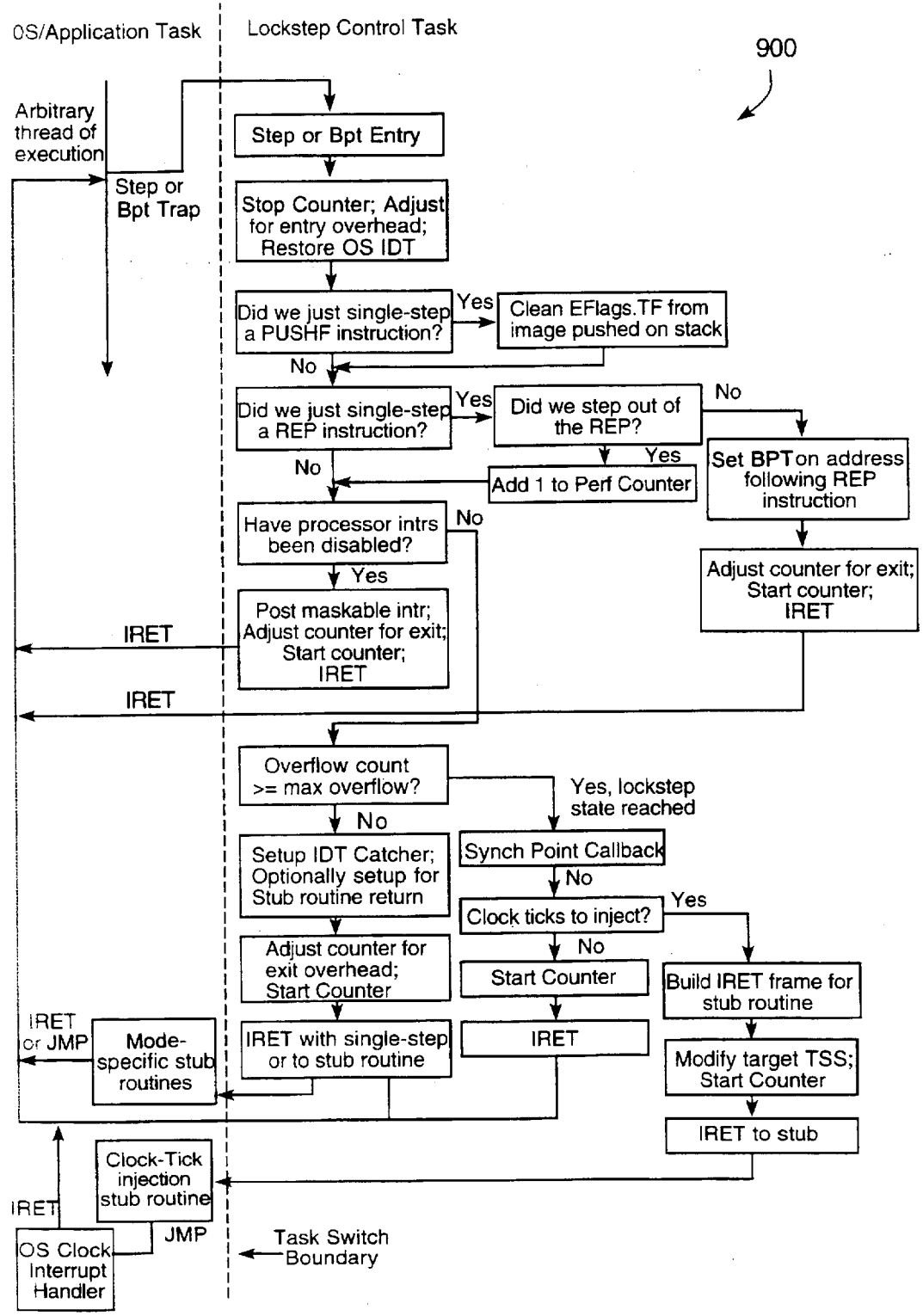
Figure 10:
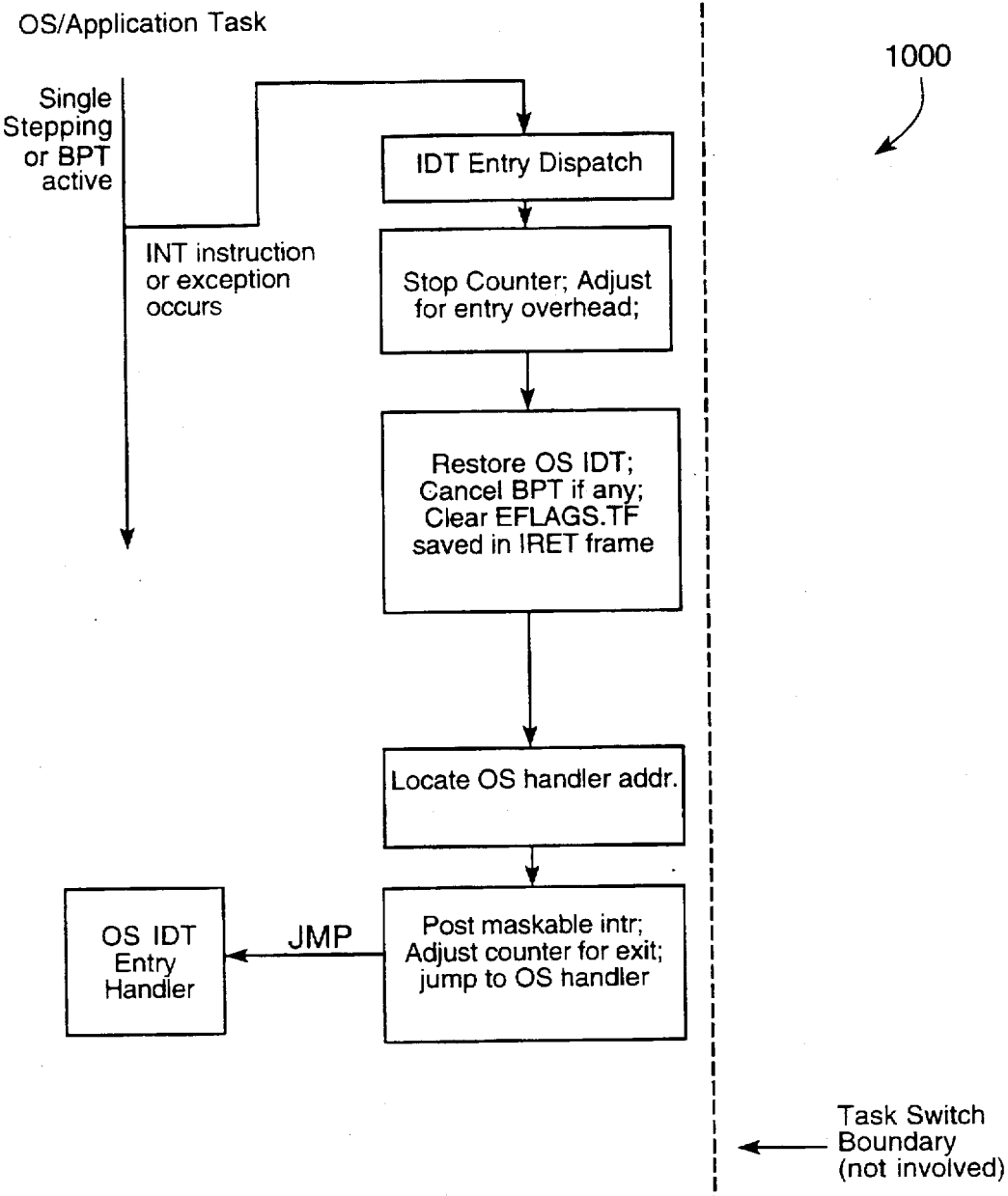

Self explanatory flow charts providing more detailed information about the procedures implemented by the lockstep control software are illustrated in FIGS. 8–10. FIG. 8 illustrates the operations 800 performed to service the maskable interrupt. FIG. 9 illustrates the operations 900 performed in single-step mode or breakpoint-burst mode. FIG. 10 illustrate the operations 1000 for handling the IDT.

Other embodiments are within the scope of the following claims.

What is claimed is:

1. A method of maintaining synchronized execution by compute elements processing instruction streams in a computer system including the compute elements and a controller, wherein each compute element comprises a clock that operates asynchronously of clocks of the other compute elements, said method comprising at each compute element:

processing instructions from an instruction stream;

counting instructions processed from the instruction stream;

initiating a synchronization procedure upon processing a quantum of instructions from the instruction stream;

after initiating the synchronization procedure, continuing to process instructions from the instruction stream and to count instructions processed from the instruction stream;

halting processing of instructions from the instruction stream after processing an unspecified number of instructions from the instruction stream in addition to the quantum of instructions;

upon halting processing, sending a synchronization request to the controller; and waiting for a synchronization reply from the controller.

2. The method of claim 1, wherein the continuing to process instructions from the instruction stream and to count instructions processed from the instruction stream comprises single-stepping through the instructions under control of the synchronization procedure.

3. The method of claim 2, wherein the continuing to process instructions comprises single-stepping through at least a specified number of instructions associated with permitted asynchronous activities of the compute element.

4. The method of claim 3, wherein each compute element comprises a processor and the specified number of instructions is determined empirically for a type associated with a compute element's processor.

5. The method of claim 2, wherein, when an instruction disables interrupts, the continuing to process instructions from the instruction stream comprises processing the instructions at full speed until interrupts are re-enabled.

6. The method of claim 2, wherein, when an instruction comprises a repeat instruction, the continuing to process instructions from the instruction stream comprises processing the instructions at full speed until an instruction following the repeat instruction is encountered.

7. The method of claim 1, further comprising, upon receiving the synchronization reply, repeating the processing, counting and initiating.

8. The method of claim 1, wherein the unspecified number of instructions is greater than or equal to a specified number of instructions associated with permitted asynchronous activities of the compute element.

9. The method of claim 8, wherein the permitted asynchronous activities comprise at least one of background DMA, memory refresh, cache fills and writebacks, branch prediction, instruction prefetch, and data prefetch.

10. The method of claim 1, wherein the initiating the synchronization procedure comprises generating an interrupt that calls the synchronization procedure.

11. The method of claim 10, wherein the generating the interrupt comprises generating the interrupt when a performance counter of the compute element indicates that the quantum of instructions have been processed.

12. The method of claim 11, further comprising disabling the performance counter when processing instructions other than instructions from the instruction stream.

13. The method of claim 12, wherein the instructions other than instructions from the instruction stream comprise instructions of the synchronization procedure.

14. The method of claim 10, wherein continuing to process instructions from the instruction stream comprises continuing to process instructions from the instruction stream after receiving the interrupt generated to call the synchronization procedure.

15. The method of claim 1, wherein the synchronization request comprises information about the state of the compute element, the method further comprising, at the controller:

receiving synchronization requests from each compute element;

cross-checking for consistency information from the synchronization requests about the states of the compute elements; and sending the synchronization reply upon determining that the states of the compute elements are consistent.

16. The method of claim 15, further comprising activating a fault handler upon determining that the states of the compute elements are inconsistent.

17. The method of claim 15, further comprising including a time-of-day update in the synchronization reply.

18. The method of claim 17, further comprising, at the compute elements, receiving the synchronization reply and updating the clocks of the compute elements based on the time-of-day update from the synchronization reply.

19. The method of claim 1, further comprising, at the controller:

receiving synchronization requests from each compute element; and sending the synchronization reply to the compute elements, the synchronization reply including a time-of-day update.

20. The method of claim 19, further comprising, at the compute elements, receiving the synchronization reply and updating the clocks of the compute elements based on the time-of-day update from the synchronization reply.

21. The method of claim 1, wherein a first compute element is separated from a second compute element by a distance of at least one hundred meters.

22. The method of claim 1, further comprising:

at the compute elements, when an instruction from the instruction stream requests information from an input/output device, redirecting the request to the controller; and at the controller, receiving the redirected request from the compute elements, processing the request, and returning results of the request to the compute elements.

23. The method of claim 1, wherein each compute element comprises an Intel Pentium Pro processor.

24. The method of claim 1, wherein the stream of instructions is associated with application and operating system software.

25. The method of claim 24, wherein the operating system software comprises unmodified, Microsoft Windows NT operating system software.

26. A computer system including compute elements configured to process instruction streams and a controller, wherein;

the compute elements and the controller are configured to maintain synchronized execution by the compute elements;

each compute element comprises a clock that operates asynchronously of clocks of the other compute elements; and each compute element is configured to:

process instructions from an instruction stream;

count instructions processed from the instruction stream;

initiate a synchronization procedure upon processing a quantum of instructions from the instruction stream;

continue to process instructions from the instruction stream and to count instructions processed from the instruction stream after initiating the synchronization procedure;

halt processing of instructions from the instruction stream after processing an unspecified number of instructions from the instruction stream in addition to the quantum of instructions;

send a synchronization request to the controller upon halting processing; and wait for a synchronization reply from the controller.

27. The system of claim 26, continuing to process instructions from the instruction stream and to count instructions processed from the instruction stream comprises single-stepping through the instructions under control of the synchronization procedure.

28. The system of claim 27, wherein continuing to process instructions comprises single-stepping through at least a specified number of instructions associated with permitted asynchronous activities of the compute element.

29. The system of claim 28, wherein each compute element comprises a processor and the specified number of instructions is determined empirically for a type associated with a compute element's processor.

30. The system of claim 27, wherein, when an instruction disables interrupts, continuing to process instructions from the instruction stream comprises processing the instructions at full speed until interrupts are re-enabled.

31. The system of claim 27, wherein, when an instruction comprises a repeat instruction, continuing to process instructions from the instruction stream comprises processing the instructions at full speed until an instruction following the repeat instruction is encountered.

32. The system of claim 26, wherein each compute element is further configured to, upon receiving the synchronization reply, repeat the processing, counting and initiating.

33. The system of claim 26, wherein the unspecified number of instructions is greater than or equal to a specified number of instructions associated with permitted asynchronous activities of the compute element.

34. The system of claim 33, wherein the permitted asynchronous activities comprise at least one of background DMA, memory refresh, cache fills and writebacks, branch prediction, instruction prefetch, and data prefetch.

35. The system of claim 26, wherein each compute element is configured to initiate the synchronization procedure by generating an interrupt that calls the synchronization procedure.

36. The system of claim 35, wherein each compute element is configured to generate the interrupt by generating the interrupt when a performance counter of the compute element indicates that the quantum of instructions have been processed.

37. The system of claim 36, wherein each compute element is configured to disable the performance counter when processing instructions other than instructions from the instruction stream.

38. The system of claim 35, wherein each compute element is configured to continue to process instructions from the instruction stream after receiving the interrupt generated to call the synchronization procedure.

39. The system of claim 26, wherein:

the synchronization request comprises information about the state of the compute element; and the controller is configured to:

receive synchronization requests from each compute element;

cross-check for consistency information from the synchronization requests about the states of the compute elements; and send the synchronization reply upon determining that the states of the compute elements are consistent.

40. The system of claim 39, wherein the controller is configured to activate a fault handler upon determining that the states of the compute elements are inconsistent.

41. The system of claim 39, wherein the controller is configured to include a time-of-day update in the synchronization reply.

42. The system of claim 41, wherein each compute element is configured to receive the synchronization reply and update the clock of the compute element based on the time-of-day update from the synchronization reply.

43. The system of claim 26, wherein the controller is configured to receive synchronization requests from each compute element and send the synchronization reply to the compute elements, with the synchronization reply including a time-of-day update.

44. The system of claim 43, wherein each compute element is configured to receive the synchronization reply and update the clock of the compute element based on the time-of-day update from the synchronization reply.

45. The system of claim 26, wherein a first compute element is separated from a second compute element by a distance of at least one hundred meters.

46. The system of claim 26, wherein each compute element is configured to redirect a request to the controller when an instruction from the instruction stream requests information from an input/output device, and the controller is configured to receive the redirected requests from the compute elements, process the requests, and return results of the request to the compute elements.

47. The system of claim 26, wherein each compute element comprises an Intel Pentium Pro processor.

* * * * *